(12) United States Patent
Sharifi et al.

(10) Patent No.: US 12,322,376 B2
(45) Date of Patent: Jun. 3, 2025

(54) PERSONALIZED SPEECH QUERY ENDPOINTING BASED ON PRIOR INTERACTION(S) INVOLVING A SPECIFIC PHRASE PRECEDING AN ENDPOINT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 339 days.

(21) Appl. No.: 17/579,949

(22) Filed: Jan. 20, 2022

(65) Prior Publication Data
US 2023/0230578 A1    Jul. 20, 2023

(51) Int. Cl.
| | |
|---|---|
| G10L 13/00 | (2006.01) |
| G06Q 10/087 | (2023.01) |
| G06Q 30/018 | (2023.01) |
| G06Q 30/02 | (2023.01) |
| G06Q 30/0207 | (2023.01) |
| G10L 15/05 | (2013.01) |
| G10L 15/16 | (2006.01) |
| G10L 15/22 | (2006.01) |
| G10L 15/26 | (2006.01) |
| G10L 25/75 | (2013.01) |

(Continued)

(52) U.S. Cl.
CPC .............. *G10L 15/05* (2013.01); *G10L 13/00* (2013.01); *G10L 15/22* (2013.01); *G10L 15/26* (2013.01); *B65G 1/127* (2013.01); *G06Q 10/087* (2013.01); *G06Q 30/0185* (2013.01); *G06Q 30/02* (2013.01); *G10L 2015/227* (2013.01); *H04M 3/4938* (2013.01); *H04R 27/00* (2013.01)

(58) Field of Classification Search
CPC ........................... G10L 25/78; H04M 1/72466
USPC ...................................... 704/15.001
See application file for complete search history.

(56) References Cited

U.S. PATENT DOCUMENTS

| | | |
|---|---|---|
| 10,269,341 B2 | 4/2019 | Tadpatrikar et al. |
| 10,475,441 B2 | 11/2019 | Lee et al. |

(Continued)

FOREIGN PATENT DOCUMENTS

EP    3 876 231 A1 *    4/2020    ............. G10L 15/22

*Primary Examiner* — Farzad Kazeminezhad
(74) *Attorney, Agent, or Firm* — Gray Ice Higdon

(57) ABSTRACT

A personalized endpointing measure can be used to determine whether a user has finished speaking a spoken utterance. Various implementations include using the personalized endpointing measure to determine whether a candidate endpoint indicates a user has finished speaking the spoken utterance or whether the user has paused and has not finished speaking the spoken utterance. Various implementations include determining the personalized endpointing measure based on a portion of a text representation of the spoken utterance immediately preceding the candidate endpoint and a user-specific measure. Additionally or alternatively, the user-specific measure can be based on the text representation immediately preceding the candidate endpoint and one or more historical interactions with the user. In various implementations, each of the historical interactions are specific to the text representation and the user, and indicate whether a previous instance of the text representation was a previous endpoint for the user.

18 Claims, 9 Drawing Sheets

(51) Int. Cl.
*H04M 1/72466* (2021.01)
*H04M 3/493* (2006.01)
*H04R 27/00* (2006.01)
*B65G 1/127* (2006.01)

(56) References Cited

U.S. PATENT DOCUMENTS

| | | |
|---|---|---|
| 10,923,111 B1 * | 2/2021 | Fan .................. G10L 15/16 |
| 2007/0129098 A1 * | 6/2007 | Cheng ............ H04M 1/72466 |
| | | 455/563 |
| 2012/0072211 A1 * | 3/2012 | Edgington ............ G10L 25/78 |
| | | 704/E15.001 |

* cited by examiner

PERSONALIZED SPEECH QUERY ENDPOINTING BASED ON PRIOR INTERACTION(S) INVOLVING A SPECIFIC PHRASE PRECEDING AN ENDPOINT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances (or touch/typed input). For example, an automatic speech recognition (ASR) engine can process audio data that correspond to a spoken utterance of a user to generate ASR output, such as speech hypotheses (i.e., sequence of term(s) and/or other token(s)) of the spoken utterance or phoneme(s) that are predicted to correspond to the spoken utterance. Further, a natural language understanding (NLU) engine can process the ASR output (or the touch/typed input) to generate NLU output, such as an intent of the user in providing the spoken utterance (or the touch/typed input) and optionally slot value(s) for parameter(s) associated with the intent. Moreover, a fulfillment engine can be used to process the NLU output, and to generate fulfillment output, such as a structured request to obtain responsive content to the spoken utterance and/or perform an action responsive to the spoken utterance, and a stream of fulfillment data can be generated based on the fulfillment output.

Generally, a dialog session with an automated assistant is initiated by a user providing a spoken utterance, and the automated assistant can respond to the spoken utterance using the aforementioned pipeline of components to generate a response. The user can continue the dialog session by providing an additional spoken utterance, and the automated assistant can respond to the additional spoken utterance using the aforementioned pipeline of components to generate an additional response. Put another way, these dialog sessions are generally turn-based in that the user takes a turn in the dialog session to provide a spoken utterance, and the automated assistant takes a turn in the dialog session to respond to the spoken utterance when the user stops speaking.

An audio-based endpointing measure can be used by the computing system in identifying when the user stops speaking. For example, the system can determine a binary signal indicating whether the user is speaking or not speaking. An example audio-based endpointing measure can indicate a threshold amount of time has passed since the user stopped speaking. For instance, a user can speak the utterance "turn off the kitchen lights". An audio-based endpointing measure can be identified based on a threshold amount of time after the user finishes speaking "turn off the kitchen lights" (e.g., 0.25 seconds, 0.5 seconds, etc.), where the audio-based endpointing measure can indicate the user has finished speaking the spoken utterance.

SUMMARY

Implementations described herein are directed towards generating a personalized endpointing measure indicating a user has finished speaking spoken utterance. In some implementations, the personalized endpointing measure can indicate whether a candidate endpoint indicates the user has finished speaking the spoken utterance (i.e., the candidate endpoint is a true endpoint), or conversely, whether the candidate endpoint indicates the user has paused speaking but has not finished speaking the spoken utterance. In some implementations, the personalized endpointing measure is based on: (1) a portion of a text representation of a spoken utterance immediately preceding a candidate endpoint and (2) a user-specific measure which is based on the text representation and one or more historical interactions with the user, where each of the historical interactions indicate whether a previous instance of the text representation was a previous endpoint.

In some implementations, a personalized endpointing measure can be used instead of and/or in addition to an audio-based endpointing measure. Audio-based endpointing measures (i.e., an audio-based endpointing measure which indicates an audio-based candidate endpoint) can indicate whether a threshold amount of time has elapsed since the user has stopped speaking (e.g., 0.1 seconds, 0.25 seconds, 0.5 seconds, 1 second, 2 seconds, and/or one or more additional amounts of time have elapsed since the user stopped speaking). However, there can be a trade off in terms of sensitivity when only using an audio-based candidate endpoint. If the threshold is set to allow for longer pauses after the user has stopped speaking, latency between the user finishing speaking and the system performing action(s) based on the spoken utterance can increase. Conversely, if the threshold indicates shorter pauses, the system risks cutting off part of the spoken utterance, thus requiring the user to repeat the spoken utterance.

In some implementations, the user can repeat a specific speech formulation while speaking a query. For example, Katherine may frequently say "what do you think about" followed by a pause when speaking a spoken utterance (e.g., a voice search query), but the pause does not indicate Katherine has finished speaking the spoken utterance. In other words, when Katherine says "what do you think about", the personalized endpointing measure, corresponding to Katherine, can indicate the pause following "what do you think about" is not a true endpoint. For example, when Katherine speaks "Assistant, what do you think about [PAUSE] the weather tomorrow", the pause after "what do you think about" does not indicate a true endpoint. Conversely, if Caleb does not generally say "what do you think about" followed by a pause, a personalized endpointing measure, corresponding to Caleb, may indicate a pause following "what do you think about" is an endpoint. Using a personalized endpointing measure can decrease latency, actual and/or user perceived, between the user finishing speaking the spoken utterance and the computing system performing one or more actions based on the spoken utterance. Additionally or alternatively, using a personalized endpointing measure can decrease the likelihood the computing system begins performing action(s) based on a partial spoken utterance before the user has actually finished speaking. For example, it can mitigate occurrences of wastefully rendering a response to what is errantly determined to be a complete utterance and/or wastefully controlling smart device(s) in response to what is errantly determined to be a complete utterance.

As a further example, the user can speak the utterance "Hey Assistant, what is on my calendar, umm yeah, [PAUSE] for tomorrow" where the user pauses after saying "umm yeah" and before saying "for tomorrow". In some implementations, the system can determine a candidate audio-based endpoint at the pause after the user says "umm yeah". However, in the illustrated example, the candidate endpoint after "umm yeah" is not the true endpoint of the spoken utterance. In some implementations, the system can determine a personalized endpointing measure based on "umm yeah" (i.e., the portion of the spoken utterance immediately preceding the candidate endpoint) and a user-specific measure. In some implementations, the user-specific measure can be based on "umm yeah" and one or more historical interactions with the user indicating whether a previous instance of the user speaking "umm yeah" immediately preceded a previous endpoint. In other words, the user-specific measure can be based on the portion of the spoken utterance (i.e., "umm yeah") immediately preceding the candidate endpoint (i.e., the candidate endpoint corresponding to the pause following "umm yeah"), along with one or more historical interactions with the user speaking "umm yeah" followed by a candidate endpoint. For instance, in a historical interaction with the system, the user could have previously spoken "OK Assistant, show me, umm yeah, [PAUSE] directions to Hypothetical Café" where the user pauses between "umm yeah" and "Hypothetical Café". In the present example, a candidate endpoint at the pause between "umm yeah" and "Hypothetical café" is not a true endpoint. Notably, had the candidate endpoint been errantly determined to be a true endpoint (e.g., absent utilizing techniques disclosed herein), this could lead to a response for "what's on my calendar" being rendered. The response could include extraneous calendar information for today and/or other days that are not being sought by the user, resulting in waste of computational resources in rendering such extraneous calendar information.

In some implementations, a personalized endpointing model can be used in generating the personalized endpointing measure (e.g., audio data capturing the spoken utterance can be processed using the personalized endpointing model to generate the personalized endpointing measure). In some implementations, the personalized endpointing model can be trained by fine tuning an existing endpointing model using one or more historical interactions with a user. Additionally or alternatively, the personalized endpointing model can be trained from scratch (i.e., training the personalized endpointing model without using a previous endpointing model). In some implementations, the personalized endpointing model can be a standalone model. Additionally or alternatively, in some implementations the personalized endpointing model can be integrated with one or more additional models, such as integrating the personalized endpointing model with a speech recognition model. In some implementations, the personalized endpointing model can be stored locally at a client device (e.g., the personalized endpointing model can be stored locally at a mobile phone of the user). Additionally or alternatively, the personalized endpointing model can be stored remotely from a client device (e.g., the personalized endpointing model is stored at a remote server and accessed by the client device through the cloud).

Accordingly, various implementations set forth techniques for generating a personalized endpointing measure based on a portion of a text representation of a spoken utterance immediately preceding a candidate and a user-specific measure. In some implementations, the user-specific measure can be based on the text representation and one or more historical interactions with the user, where each of the historical interactions indicate whether a previous instance of the text representation was a previous endpoint. There is a tradeoff when a system uses only an audio-based endpointing measure (e.g., an endpointing measure generated using a non-personalized endpointing model), where a user encounters higher latency and must wait longer for action(s) following speaking an utterance when there is a longer threshold, and/or the user may have to repeat commands when the system cuts off mid utterance when there is a shorter threshold. In contrast, implementations disclosed herein include determining a personalized endpointing measure for the user speaking the spoken utterance. Using the personalized endpointing measure can reduce the number of times a user must repeat spoken utterances where the system prematurely determines an endpoint before the user has finished speaking the utterance. Additionally or alternatively, using the personalized endpoint measure can reduce latency, compared to only using an audio-based endpoint, between the user finishing speaking a spoken utterance and the system performing action(s) based on the spoken utterance.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
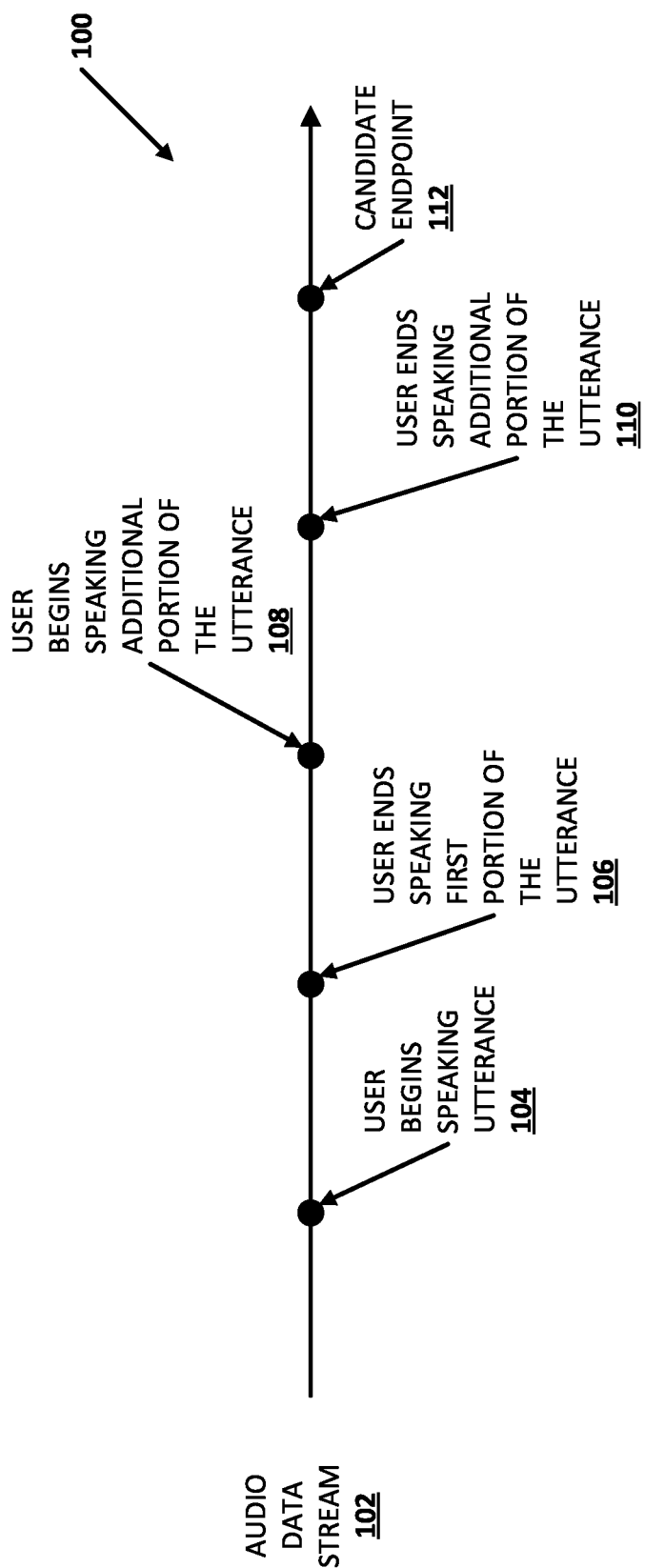
FIG. 1 illustrates an example of generating a candidate endpoint based on an audio data stream in accordance with various implementations disclosed herein.

Users can interact with smart devices (e.g., mobile phones, stand alone interactive speakers, smart watches, etc.) using their voice. Speech input can be a natural and/or convenient way to communicate with a computing device. However, determining an endpoint (i.e., when the system should stop listening for speech input, perform action(s) based on the speech input, and/or consider the query complete) can be challenging for query-based speech systems. There is a tradeoff when a system uses only an audio-based endpointing measure, where a user encounters higher latency and must wait longer for action(s) following speaking an utterance when there is a longer threshold, and/or the user may have to repeat commands when the system cuts off mid utterance when there is a shorter threshold.

Computing systems can use a conversation-based interface, where users can formulate search queries in many ways, e.g., "can you turn off the lights", "please could you turn off the lights", "turn off the lights", etc. The same user can use similar formulations across search queries. In some implementations, these formulations can be used by the system to anticipate when the user is done speaking the query (i.e., determining an endpoint for the search query).

In some implementations, the system can learn a user-specific personalized endpointing model, which can identify specific speech formulations from a single user when issuing a speech query. For example, a user can frequently start off speech search queries with "what do you think about . . . ". Based on past queries from the same user, the system can determine the user does not want the endpoint to fire (and the query to be considered complete) at this point since there will always be a question that follows, even if the user pauses. Additionally or alternatively, the system may learn from historical queries that the user tends to take an unusually long pause after saying "what do you think about" because the user needs more thinking to form the part of the query that follows. In some implementations, using personalized endpointing measures can reduce the likelihood of cutting the user off during a query, thereby reducing the number of query retries the user makes, which can save time, data, processing costs, etc.) and/or can generally improve the overall voice search experience for the user.

In some implementations, a user can speak a query (i.e., a spoken utterance) to a voice-based interface, such as a voice search interface, a virtual assistant assistance, and/or one or more additional voice-based interfaces. In some implementations, while the user is speaking the utterance, a speech recognition engine can process audio data capturing the spoken utterance to generate a text representation of the spoken utterance and an audio-based endpointing measure (e.g., a candidate endpoint) indicating the end of the query. In some implementations, the speech recognition engine can process the audio data locally at the client device. In some other implementations, the speech recognition engine can process the audio data remotely from the client device (i.e., in the cloud).

In some implementations, when a user first interacts with the system, a general (i.e., non-personalized) endpoint can be used while the system collects historical interactions to train a personalized endpointing model for the user. Additionally or alternatively, the system can train a baseline personalized endpointing model for the user based on one or more signals from an account corresponding to the user (with the user's permission). In some implementations, once the system considers the user's utterance to be complete (e.g., an endpointing measure indicates the utterance is complete), the query can be handled and result(s) can be returned to the user.

In some implementations, the personalized endpointing model can be trained based on one or more historical interactions with the user. For example, if in historical interactions the user frequently asks "what do you think about . . . " before continuing to say the name of a specific topic or entity, the personalized endpointing model can be trained such that an input of "what do you think about" will not lead to an endpointing event. For instance, a historical interaction can be generated based on how a user interacts with result(s) generated by the system for a query. In some implementations, if the user interacts with the results (e.g., accepts the action, clicks on a result, etc.), then the historical interaction can be considered a positive training example as the query was likely not cut off and/or was likely interpreted correctly. Conversely, in some other implementations, if the user does not interact with the results and/or makes a follow up query which is a longer and/or more specific version of the previous query, the historical interaction an be considered a negative training example as the query was likely cut off and/or was likely interpreted incorrectly.

In some implementations, the historical interactions can be stored as training data including a positive or negative label and/or (optionally) additional feature(s) derived from the training example such as a transcription of the query itself, the duration of a pause between words in the spoken utterance, intonation, one or more additional features, and/or combinations thereof. In some implementations, a historical interaction (and corresponding training instance) can be associated with the user who spoke the utterance based on a voiceprint associated with the user (i.e., a voice matching technique comparing one or more features of the utterance to feature(s) of additional utterance(s) known to be spoken by the user). Additionally or alternatively, a historical interaction (and corresponding training instance) can be associated with the user based on the device capturing the historical interaction. For example, if the historical interaction is captured via a microphone of a mobile phone known to be owned by Katherine, the historical interaction can be associated with Katherine. In some implementations, a personalized endpointing model can be trained to generate a personalized endpointing measure corresponding to a specific context, such as training a personalized cooking endpointing model to generate a personalized endpointing measure while the user is cooking, where the personalized cooking endpointing model can be trained using historical interaction(s) captured while the user was cooking; a personalized driving endpointing model can be trained to generate a personalized endpointing measure while the user is driving, where the personalized driving endpointing model can be trained using historical interaction(s) captured while the user was driving; etc.

For example, the personalized endpointing model can be trained based on a first historical interaction of the user saying "what do you think about [PAUSE]" where the system determines a candidate endpoint based on the pause. In some implementations, the user can follow up the first historical interaction with "what do you think about Hypothetical Cafe", i.e., a follow up query which is a longer version of "what do you think about [PAUSE]". In some of those implementations, the follow up query which is a longer version of the initial query can indicate the first historical interaction is a negative training example, as the initial query was likely cut off. In some implementations, audio data capturing the first historical interaction of "what do you think about [PAUSE]" and/or a text representation of 'what do you think about' can be processed using the personalized endpointing model to generate training output. A first loss can be generated based on comparison of the generated training output and an indication that the first historical interaction is a negative training example. Additionally or alternatively, one or more portions of the personalized endpointing model can be updated based on the first generated loss.

As a further example, the personalized endpointing model can be trained based on a second historical interaction of the user saying "What do you think about [PAUSE] Hypothetical Cafe" where the system does not determine a candidate endpoint based on the pause. In some implementations, the system can render output to the user relating to the Hypothetical Cafe. If the user interacting with that output (e.g., the user clicking on a link providing more information about Hypothetical Cafe's hours of operation) can provide an indication the second historical interaction is a positive training instance. In some implementations, audio data capturing the second historical interaction of "what do you think about [PAUSE] Hypothetical Cafe" and/or a text representation of 'what do you think about Hypothetical Cafe' can be processed using the personalized endpointing model to generate additional training output. A second loss can be generated based on comparison of the generated additional training output and an indication that the second historical interaction is a positive training example. Additionally or alternatively, one or more portions of the personalized endpointing model can be updated based on the second generated loss.

Additionally or alternatively, the historical interactions can be used to generate a list of one or more phrases frequently spoken by the user, that if detected by the system, may indicate a delay before the user continues to speak the query. For example, the first historical interaction of the user saying "what do you think about [PAUSE]" with the indication of a negative training example and/or the second historical interaction of the user saying "what do you think about [PAUSE] Hypothetical Cafe" with the indication of a positive training example can be used to determine the user frequently says "what do you think about" followed by a long pause before continuing to speak a voice query. The system can then allow a longer pause before determining an endpoint in response to the user speaking "what do you think about". In some implementations, the system can allow a longer pause before determining an endpoint in response to the user speaking an equivalent phrase to "what do you think about" such as the phrases "what do ya think about", "what do you think umm about", "what yeah do you think about", etc. In some of those implementations, the system can determine whether one or more phrases are equivalent based on a similarity between the text of the phrases, based on a similarity between an embedding representation of the phrases, based on the similarity between one or more additional representations of the phrases, and/or combinations thereof.

In some implementations, the personalized endpointing model can be a refined version of an original endpointing model. In other words, the training instances can be used to fine-tune an original endpointing model to generate the personalized endpointing model. In some of those implementations, a fine tuned personalized endpointing model can be trained with fewer training examples compared to training a new model from scratch.

Additionally or alternatively, the personalized endpointing model can be trained as a standalone model that takes an input, a sequence of words and associated features, to predict a likelihood of an end of speech event (e.g., a personalized endpointing measure). In some of those implementations, the personalized endpointing model can be trained to predict, at each word, how likely the user is to continue speaking given a transcription of the spoken utterance so far and/or other features so far. The personalized endpointing model can output a probability of how likely other words are to follow (e.g., a personalized endpointing measure). In contrast to a language model which predicts a probability distribution over all words or end of sentence, the personalized endpointing model can collapse all possible words into a single class. Furthermore, the personalized endpointing model can consider other signals as input, such as the utterance audio (or derived features), pause duration, intonation, one or more additional features, and/or combinations thereof.

In some implementations, historical interaction(s) can be upweighted and/or processed using a separate model/heuristic to put a stronger emphasis on recent queries. For example, if a user just asked "can you play Hypothetical Band of Hypothetical Media Player" and then shortly after follows up with a query "can you play . . . ", the user is more likely to be requesting another song and is unlikely to have ended the utterance. In some of those implementations, based on the personalized endpointing measure, the system can continue to listen for additional speech for the user, even if it requires a longer pause than usual.

In some implementations, a personalized endpointing measure generated using the personalized endpointing model can be used instead of an endpointing measure generated using a non-personalized endpointing model (e.g., an endpointing measure generated using a model not personalized for the user). Additionally or alternatively, the personalized endpointing measure generated using the personalized endpointing model can be used along with one or more additional endpointing measures generated using non-personalized models.

Figure 2:
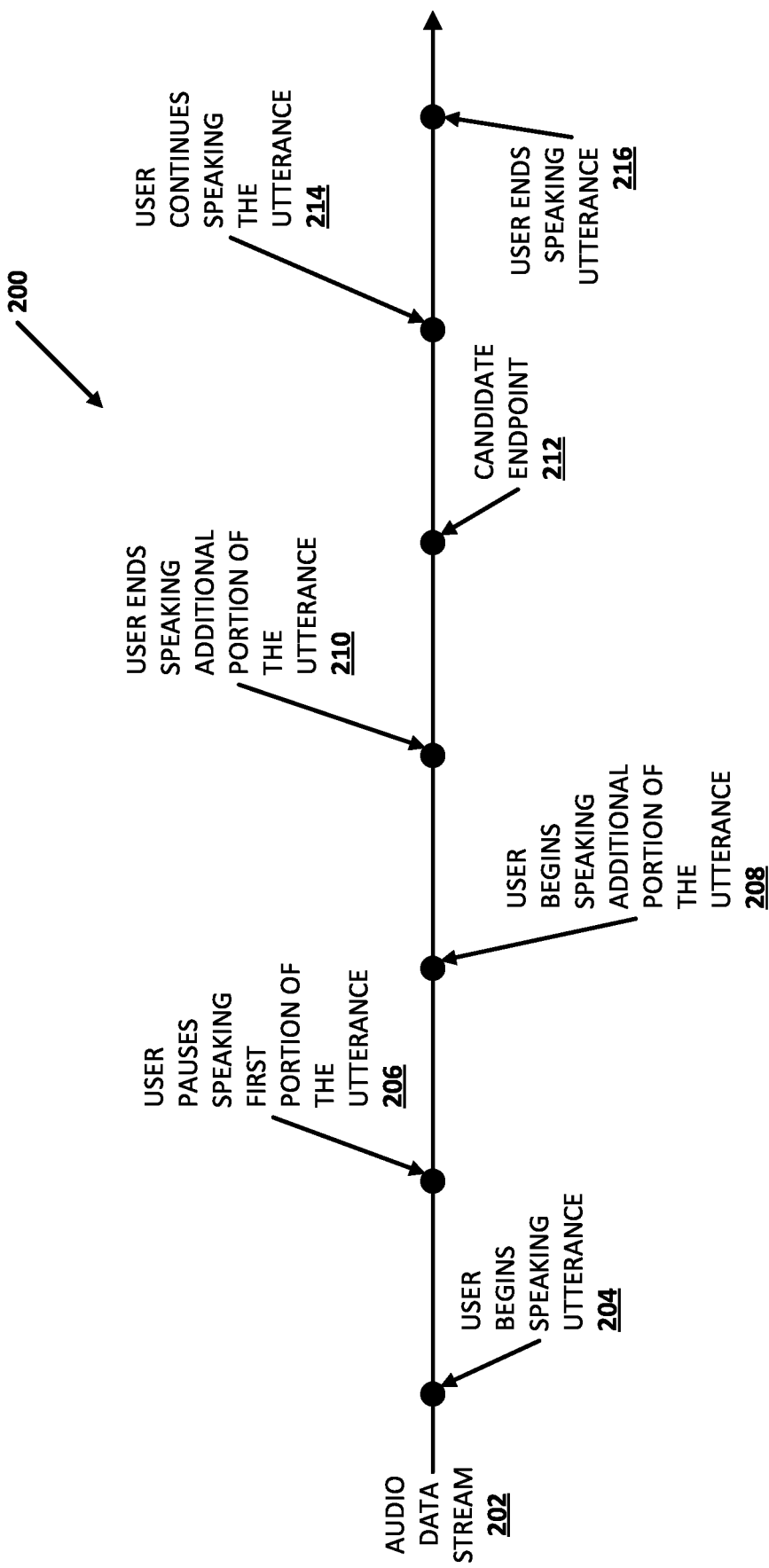
FIG. 2 illustrates another example of generating a candidate endpoint based on an audio data stream in accordance with various implementations disclosed herein.
Figure 3:
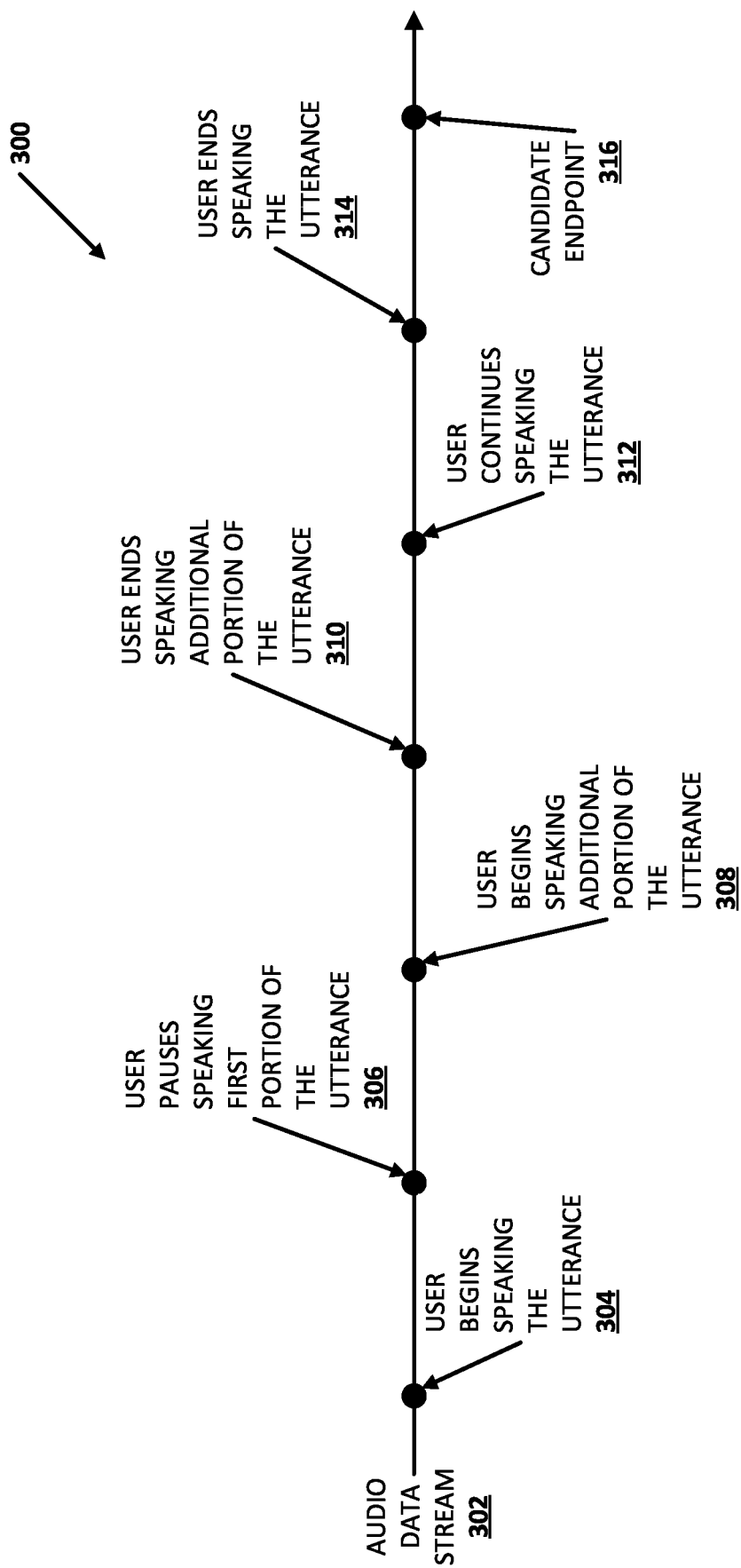
FIG. 3 illustrates another example of generating a candidate endpoint based on an audio data stream in accordance with various implementations disclosed herein.
Figure 4:
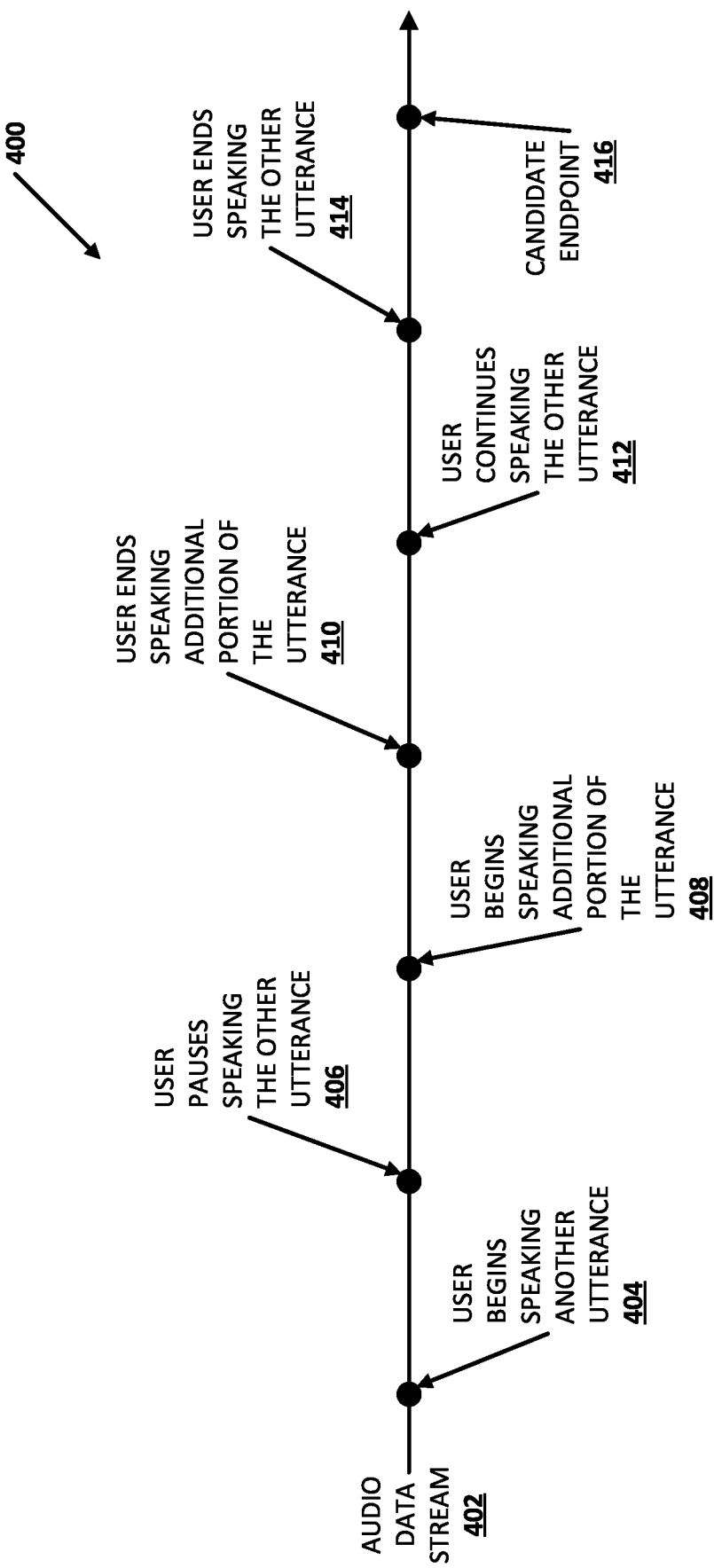
FIG. 4 illustrates another example of generating a candidate endpoint based on an audio data stream in accordance with various implementations disclosed herein.

Turning now to the figures, FIGS. 1-4 illustrate candidate endpoints generated based on example audio data streams. FIGS. 1 and 2 do not use a personalized endpointing measure, while FIGS. 3 and 4 illustrate using a personalized endpointing measure. FIG. 1 illustrates an audio data stream capturing the spoken utterance of "Assistant, turn on the kitchen lights, ok sure [PAUSE]" without the use of a personalized endpointing measure. FIG. 2 illustrates an audio data stream capturing the spoken utterance of "Assistant, turn on, ok sure [PAUSE], the kitchen lights" without the use of a personalized endpointing measure. FIG. 3 similarly illustrates an audio data stream capturing the spoken utterance of "Assistant, turn on, ok sure [PAUSE], the kitchen lights". However, the example illustrated in FIG. 3 uses a personalized endpointing measure. Additionally, FIG. 4 illustrates an audio data stream capturing the spoken utterance of "OK Assistant, what is the temperature, ok sure [PAUSE], at the zoo" and uses a personalized endpoint.

FIG. 1 illustrates an example 100 in accordance with some implementations. Example 100 includes an audio data stream 102. Audio data stream 102 captures a spoken utterance spoken by a user of a client device. In some implementations, the spoken utterance can be captured via one or more microphones of the client device. For example, the user can speak the spoken utterance 102 of "Assistant, turn on the kitchen lights, ok sure [PAUSE]" where "ok sure" is followed by a pause. In the illustrated example 100, the user begins speaking a spoken utterance at point 104. The user can end speaking a first portion of the spoken utterance of "Assistant, turn on the kitchen lights" at point 106. The user can begin speaking an additional portion of the utterance of "ok sure" at point 108 and can end speaking the "ok sure" at point 110. The system can determine a candidate endpoint at point 112 based on the user pausing after saying "ok sure". In example 100, the candidate endpoint at point 112 is the true endpoint of the spoken utterance.

FIG. 2 illustrates another example 200 of an audio data stream capturing the user saying "Assistant, turn on, ok sure [PAUSE], the kitchen lights". In contrast to example 100, the pause after the user says "ok sure" in example 200 does not indicate a true endpoint. In example 200, audio data stream 202 captures the user speaking "Assistant, turn on, ok sure [PAUSE], the kitchen lights". At point 204, the user can begin speaking the spoken utterance. The user pauses speaking the first portion of the utterance of "Assistant, turn on" at point 206. At point 208, the user can begin speaking the additional portion of the spoken utterance of "ok sure" and can finish speaking the additional portion at point 210. In the illustrated example 200, the system determines a candidate endpoint based on the pause after the user speaks "ok sure" at point 212. However, the candidate endpoint 212 is not a true endpoint. Additionally or alternatively, the user can continue speaking the utterance by beginning to speak "the kitchen lights" at point 214, and can end speaking "the kitchen lights" at point 216.

Similarly to FIG. 2, FIG. 3 illustrates an example 300 of an audio data stream 302 of the user saying "Assistant, turn on, ok sure [PAUSE], the kitchen lights". However, the system in FIG. 3 uses a personalized endpointing measure. At point 304, the user begins speaking the utterance. The user pauses speaking the first portion of the utterance of "Assistant, turn on" at point 306. At point 308, the user can begin speaking the additional portion of the spoken utterance of "ok sure" and can finish speaking the additional portion at point 310. By using a personalized endpointing measure, the system in FIG. 3 can correctly determine the pause after the user says "ok sure" is not an endpoint. At point 312, the user can continue speaking the utterance by speaking "the kitchen lights", and can end speaking "the kitchen lights" at point 314. At point 316, the system can determine a candidate endpoint based on the pause after the user speaks "the kitchen lights" is a true endpoint by using a personalized endpoint.

FIG. 4 illustrates an example 400 of an audio data stream 402 of the user saying "OK Assistant, what is the temperature, ok sure [PAUSE], at the zoo". Example 400 includes "ok sure", i.e., the same portion of text prior to a candidate endpoint as example 300. However, the rest of the spoken utterance captured in audio data stream 402 is distinct from the spoken utterance captured in audio data stream 302. In some implementations, "ok sure [PAUSE]" can be frequently spoken by the user and can be used in training a personalized endpointing model for the user. At point 404, the user begins speaking another utterance of "OK Assistant, what is the temperature", and pauses speaking the spoken utterance at point 406. At point 408, the user begins speaking an additional portion of the utterance of "ok sure" and ends speaking the additional portion at point 410. In some implementations, the system can determine a candidate endpoint based on the pause after the user says "ok sure" and before the user says "at the zoo" is a candidate endpoint. However, the system illustrated in example 400 utilizes a personalized endpointing model and can determine the candidate endpoint between "ok sure" and "at the zoo" is not a true endpoint. Furthermore, the user can continue speaking the other utterance at point 412 of "at the zoo" and can finish speaking the other utterance of "at the zoo" at point 414. Additionally or alternatively, the system can detect a candidate endpoint at point 416 once the user has finished speaking "at the zoo". In the illustrated example, the system can determine the candidate endpoint at point 416 is a true endpoint.

Figure 5:
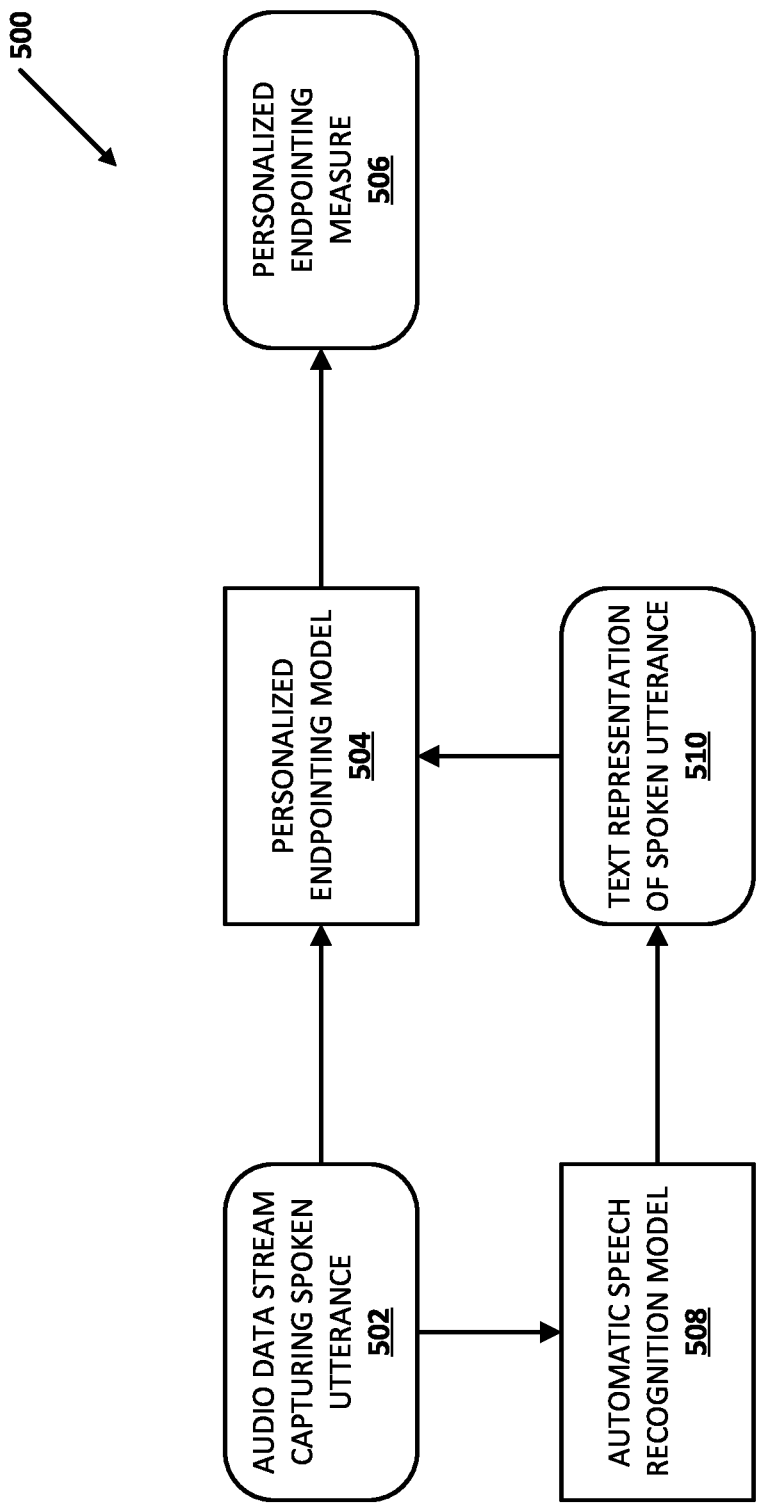
FIG. 5 is a block diagram illustrating an example of generating an endpoint using a personalized endpointing model in accordance with implementations disclosed herein.

FIG. 5 illustrates an example 500 of generating a personalized endpointing measure in accordance with some implementations. Example 500 includes an audio data stream capturing a spoken utterance 502. In some implementations, the audio data stream capturing the spoken utterance 502 can be captured via one or more microphones of a client device. In some implementations, the audio data stream 502 can be processed using an automatic speech recognition ("ASR") model 508 to generate a text representation of the spoken utterance 510. In some implementations, the ASR model 508 can identify a candidate endpoint in the audio data stream 502. Additionally or alternatively, a separate endpointing model (not depicted) can identify a candidate endpoint the audio data stream 502. In some implementations, a personalized endpointing model 504 can process the text representation of the spoken utterance 510 (or a portion of the text representation of the spoken utterance immediately preceding the candidate endpoint) to generate a personalized endpointing measure 506. In some implementations, the personalized endpoinging model 504 can process the audio data stream capturing the spoken utterance 502 to generate the personalized endpointing measure 506. Additionally or alternatively, the personalized endpoinging model 504 can process the audio data capturing the spoken utterance 502 and the text representation of the spoken utterance 510 to generate the personalized endpoinging measure 506.

Figure 6:
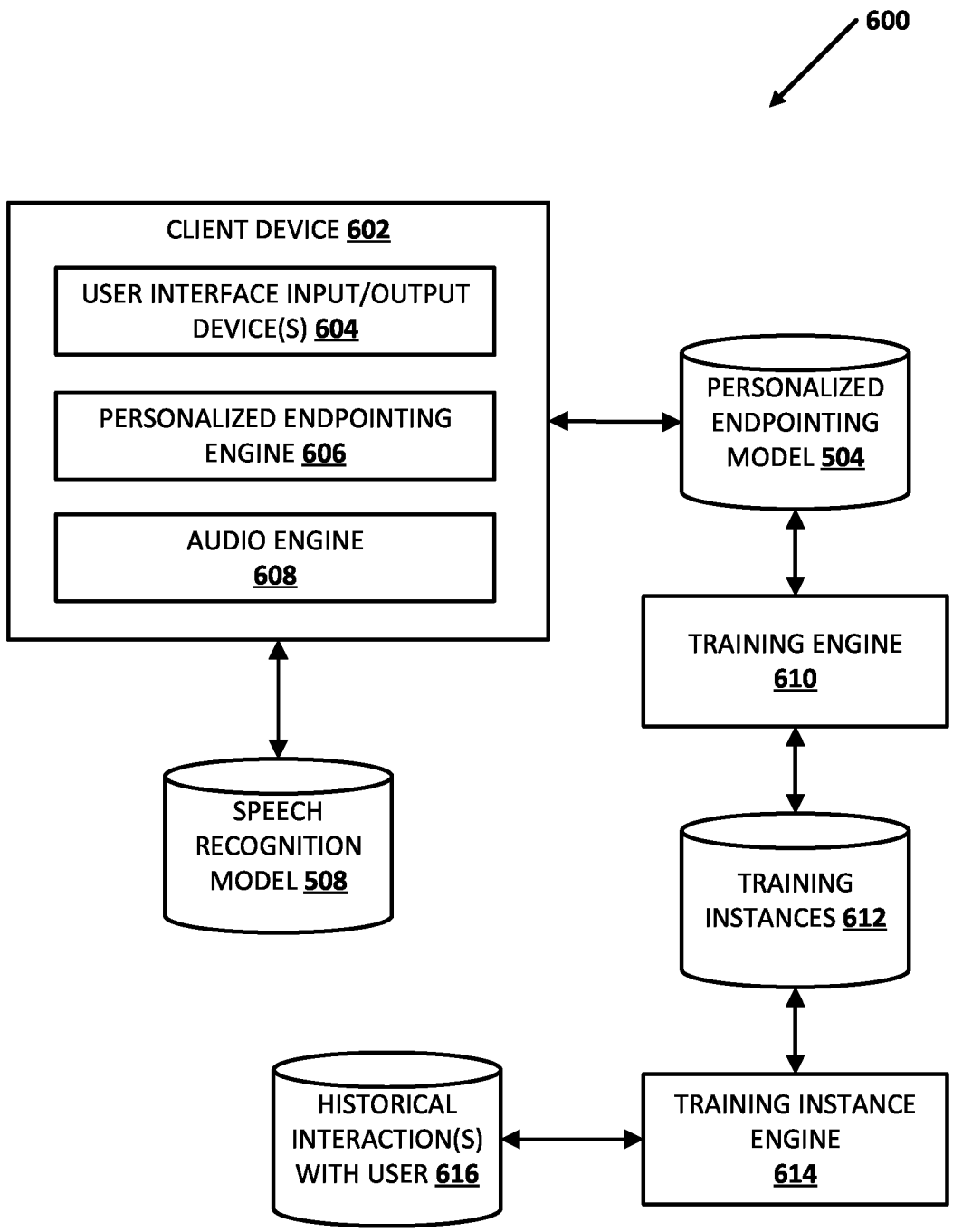
FIG. 6 illustrates an example environment in which various implementations disclosed herein may be implemented.

FIG. 6 illustrates a block diagram of an example environment 600 in which various implementations may be implemented. The example environment 600 includes a client device 602 which can include user interface input/output device(s) 604, personalized endpointing engine 606, audio engine 608, training engine 610, training instance engine 614 and/or one or more additional engines (not depicted). Additionally or alternatively, client device 602 may be associated with personalized endpointing model 504, speech recognition model 508, training instances 612, and/or one or more additional components (not depicted).

In some implementations, client device 602 may include user interface input/output devices 604, which may include, for example, a physical keyboard, a touch screen (e.g., implementing a virtual keyboard or other textual input mechanisms), a microphone, a camera, a display screen, and/or speaker(s). Additionally or alternatively, client device 602 can include a variety of sensors (not depicted) such as an accelerometer, a gyroscope, a Global Positioning System (GPS), a pressure sensor, a light sensor, a distance sensor, a proximity sensor, a temperature sensor, one or more additional sensors, and/or combinations thereof. The user interface input/output devices may be incorporated with one or more client devices 602 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of client device 602 may be implemented on a computing system that also contains the user interface input/output devices. In some implementations client device 602 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of client device 602 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 602 may include one or more memories for storage of data and software applications, one or more processors for accessing data and executing applications, and other components that facilitate communication over a network. The operations performed by client device 602 may be distributed across multiple computing devices. For example, computing programs running on one or more computers in one or more locations can be coupled to each other through a network. In some implementations, client device 602 can be a mobile phone with a front facing camera and/or an accelerometer, a smart watch with an accelerometer, a standalone hardware device with a front facing camera, etc.

In some implementations, audio engine 608 can process an audio data stream capturing a spoken utterance (such as audio data streams 102, 202, 302, 402, and/or one or more alternative data streams) using a speech recognition model 508 to generate a text representation of the spoken utterance (e.g., text representation of the spoken utterance 510 as illustrated in FIG. 5). In some implementations, speech recognition model 508 can generate a candidate endpoint (i.e., an audio based endpointing measure) based on the audio data. In some implementations, the speech recognition model 508 can be a standalone speech recognition model. In some other implementations, the speech recognition model 508 can be integrated into additional model(s), such as personalized endpointing model 504.

Additionally or alternatively, audio engine 608 can perform one or more actions based on the spoken utterance. In some implementations, the system can perform one or more actions based on the spoken utterance including processing the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.).

Personalized endpointing engine 606 can process the audio data stream and/or a transcript of the audio data stream using personalized endpointing model 504 to generate a personalized endpointing measure. In some implementations, the personalized endpointing measure can be used in place of other endpointing measure(s). In some other implementations, the personalized endpointing measure can be used along with additional endpointing measure(s), such as an endpointing measure generated using speech recognition model 508.

In some implementations, personalized endpointing engine 606 can process one or more additional signals (i.e., in addition to the audio data stream and/or the transcript of the audio data stream) using the personalized endpointing model 504 to generate the personalized endpointing measure. In some implementations, the one or more additional signals can capture environmental aspects that can lead to changes in how quickly a user formulates input. For example, the one or more additional signals can indicate the loudness of the environment of the user, whether there is a conversation in the background of the environment of the user, whether another person is talking with the user, etc. which may increase or decrease the amount of time it takes for the user to formulate spoken input.

In some implementations, training instance engine 614 can generate one or more training instances 612 based on one or more historical interactions with the user 616. For example, if in historical interactions the user frequently asks "what do you think about . . . " before continuing to say the name of a specific topic or entity, the personalized endpointing model can be trained such that an input of "what do you think about" will not lead to an endpointing event. For instance, a historical interaction can be generated based on how a user interacts with result(s) generated by the system for a query. In some implementations, if the user interacts with the results (e.g., accepts the action, clicks on a result, etc.), then the historical interaction can be considered a positive training example as the query was likely not cut off and/or was likely interpreted correctly. Conversely, in some other implementations, if the user does not interact with the results and/or makes a follow up query which is a longer version of the previous query, the historical interaction can be considered a negative training example as the query was likely cut off and/or was likely interpreted incorrectly.

In some implementations, the historical interactions can be stored as training data including a positive or negative label and/or (optionally) additional feature(s) derived from the training example such as a transcription of the query itself, the duration of a pause between words in the spoken utterance, intonation, one or more additional features, and/or combinations thereof. In some implementations, a historical interaction (and corresponding training instance) can be associated with the user who spoken the utterance based on a voiceprint associated with the user (i.e., a voice matching technique comparing one or more features of the utterance to feature(s) of additional utterance(s) known to be spoken by the user). Additionally or alternatively, a historical interaction (and corresponding training instance) can be associated with the user based on the device capturing the historical interaction. For example, if the historical interaction is captured via a microphone of a mobile phone known to be owned by Katherine, the historical interaction can be associated with Katherine.

In some implementations, training engine 610 can process one or more training instances 612 to train personalized endpointing model 504. In some implementations, training engine 610 can train the personalized endpointing model 504 using a supervised learning technique. For example, a training instance can include audio data capturing a previous spoken utterance by the user and a label indicating whether the training instance is a positive or negative training example. In some implementations, personalized endpointing model 504 can be a standalone model, trained using the training instances 612. Additionally or alternatively, personalized endpointing model 504 can be trained by fine-tuning an existing endpointing model. In some implementations, training engine 610 can train the personalized endpointing model 504 using a reinforcement learning technique. For example, an initial policy (i.e., a personalized endpointing model from historical data) can use a controlled level of exploration to collect one or more additional training instances, where the additional training instances can be used to further improve the model.

Figure 7:
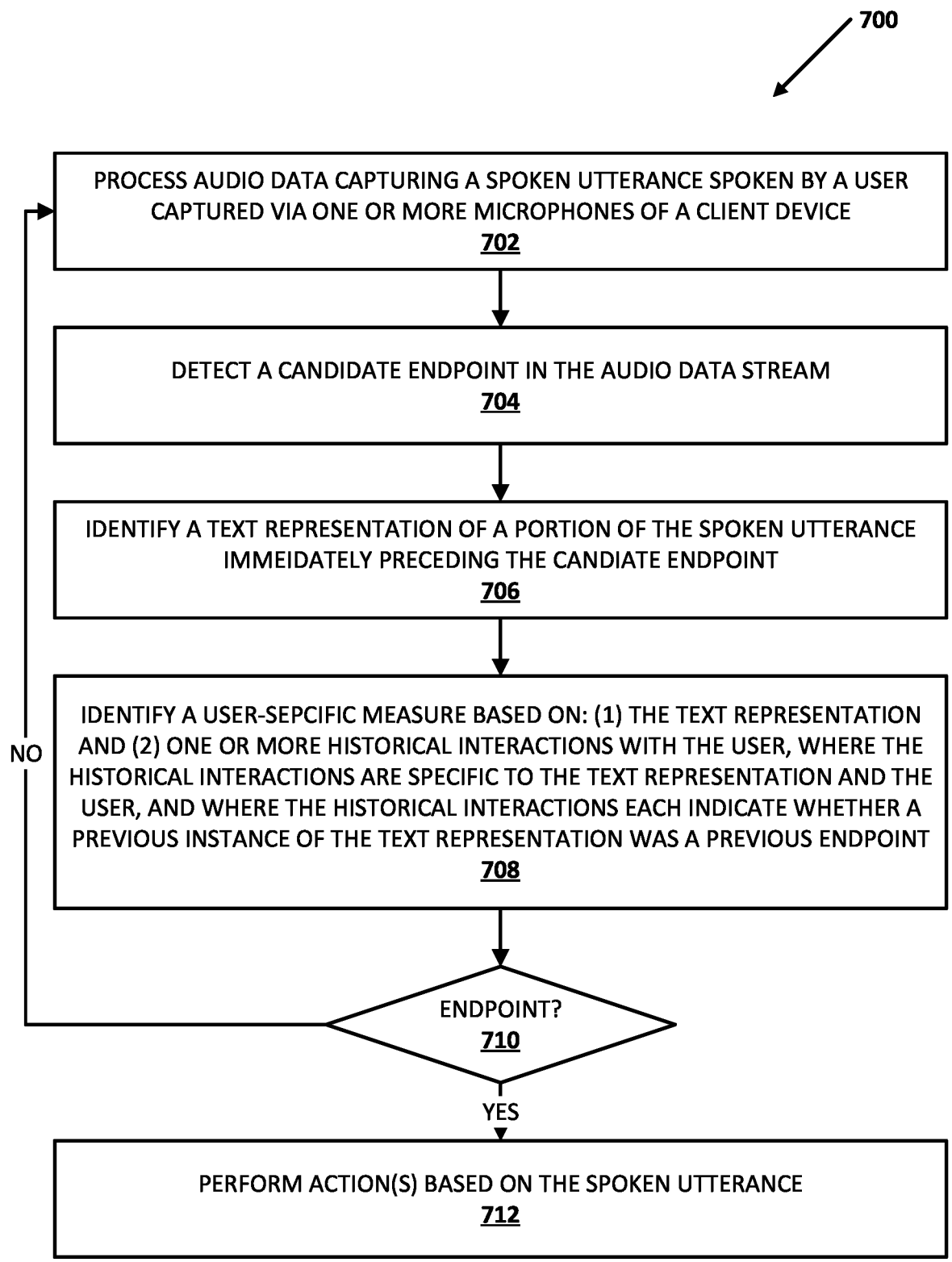
FIG. 7 is a flowchart illustrating an example of determining a personalized endpointing measure in accordance with various implementations disclosed herein.

FIG. 7 is a flowchart illustrating an example process of 700 of generating a personalized endpointing measure in accordance with various implementations disclosed herein. For convenience, the operations of the flowchart are described with reference to a system that performs the operations. This system may include various components of various computer systems, such as one or more components of client device 602, client device 802, and/or computing system 910. Moreover, while operations of process 700 are shown in a particular order, this is not meant to be limiting. One or more operations may be reordered, omitted, and/or added.

At block 702, the system processes audio data capturing a spoken utterance spoken by a user. In some implementations, the audio data is captured via one or more microphones of a client device. In some implementations, the system processes the audio data using a speech recognition model to generate a text representation of the spoken utterance. For example, the system can process a spoken utterance spoken by James of "Assistant, show me ok umm [PAUSE] pictures from my vacation" using a speech recognition model to generate a text representation of the spoken utterance.

At block 704, the system detects a candidate endpoint in the audio data stream. In some implementations, the system can detect the candidate endpoint while processing the audio data using the ASR model described in block 702. Additionally or alternatively, the system can detect a candidate endpoint based on processing the audio data using a standalone endpointing model. Furthermore, the system can detect a candidate endpoint based on processing the audio data using a personalized endpointing model. For example, the system can detect a candidate endpoint at the pause after James speaks "Assistant, show me ok umm".

At block 706, the system identifies a text representation of a portion of the spoken utterance immediately preceding the candidate endpoint. For example, the system can identify "ok umm" as the portion of the spoken utterance immediately preceding the candidate endpoint. In some implementations, the system can compare the text representation of the spoken utterance with one or more historical interactions with the user, where the historical interactions indicate one or more specific speech formulations frequently said by the user. For example, the historical interactions can identify one or more specific speech formulations the user has spoken over a threshold number of times (e.g., the user has spoken the speech formulation over 10 times, over 50 times, over 100 times, and/or over one or more additional number of times). Additionally or alternatively, the system can identify the portion of the spoken utterance immediately preceding the candidate endpoint by processing the text representation using the personalized endpointing model.

At block 708, the system identifies a user-specific measure. In some implementations, the user-specific measure is based on (1) the text representation of the portion of the spoken utterance immediately preceding the candidate endpoint and (2) one or more historical interactions with the user. In some implementations, the historical interactions are specific to the text representation and the user, where the historical interactions each indicate whether a previous instance of the text representation was a previous endpoint.

In some implementations, the system can generate the user-specific measure by processing the portion of the text representation of the spoken utterance immediately preceding the candidate endpoint and/or the audio data capturing the spoken utterance using the personalized endpointing model. In some implementations, the personalized endpointing model can be trained using the one or more historical interactions. In some of those implementations, each historical interaction is specific to the text representation and the user. For example, each historical interaction can be based on a previous time James spoke "ok umm" immediately preceding a candidate endpoint. Additionally or alternatively, each historical interaction can include an indication of whether the previous candidate endpoint was a true endpoint.

For example, a given historical interaction can be based on James speaking "Hey Assistant, what is the weather ok umm [PAUSE] tomorrow", where a candidate endpoint is identified based on the pause between "ok umm" and "tomorrow". In the given historical interaction, the candidate endpoint is not a true endpoint. Additionally or alternatively, an additional historical interaction can be based on James speaking "OK Assistant, show me videos from my birthday party, ok umm" where a candidate endpoint is identified after the user speaks "ok umm". In the additional historical interaction, the candidate endpoint is a true endpoint.

In some implementations, a prior interaction with Scott speaking the utterance "Hey Assistant, what is the weather ok umm [PAUSE] tomorrow" with a candidate endpoint based on the pause between "ok umm" and "tomorrow" would not be a historical interaction used in identifying the user-specific measure since the prior utterance was spoken by Scott and not James. Additionally or alternatively, a prior interaction with James speaking "Hey Assistant, what is the weather yeah sure [PAUSE] tomorrow" with a candidate endpoint based on the pause between "yeah sure" and "tomorrow" would not be a historical interaction used in identifying the user-specific measure since the text immediately preceding the candidate endpoint of "yeah sure" is not the text immediately preceding the candidate endpoint (i.e., "ok umm") identified at block 706.

At block 710, the system determines whether the candidate endpoint is a true endpoint. In some implementations, the system can determine whether the candidate endpoint is a true endpoint based on whether the user-specific measure satisfies one or more conditions, such as whether the user-specific measure exceeds a threshold value, whether one or more conditions are satisfied, and/or combinations thereof.

If the system determines the candidate endpoint is not a true endpoint, the system proceeds back to block 702 to continue processing audio data capturing the spoken utterance, detecting an additional candidate endpoint in the audio data stream at block 704, identifying an additional portion of the spoken utterance immediately preceding the additional endpoint at block 706, before identifying an additional user-specific measure at block 708. For example, if the system determines the candidate endpoint based on the pause between "ok umm" and "tomorrow" in the utterance of "Assistant, show me ok umm [PAUSE] pictures from my vacation" is not a true endpoint, the system can subsequently identify a pause after the user speaks "tomorrow" as an additional candidate endpoint at block 704 and proceed to blocks 706 and 708 based on the additional candidate endpoint. If the system determines the candidate endpoint is a true endpoint, the system proceeds to block 712.

At block 712, the system performs one or more actions based on the spoken utterance. The system can perform one or more actions based on the spoken utterance including displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.). For instance, the system can render images of the user's vacation in response to the utterance "Assistant, show me ok umm [PAUSE] pictures from my vacation". In some implementations, the system can perform one or more actions based on the spoken utterance using the audio engine 608 described herein.

Figure 8:
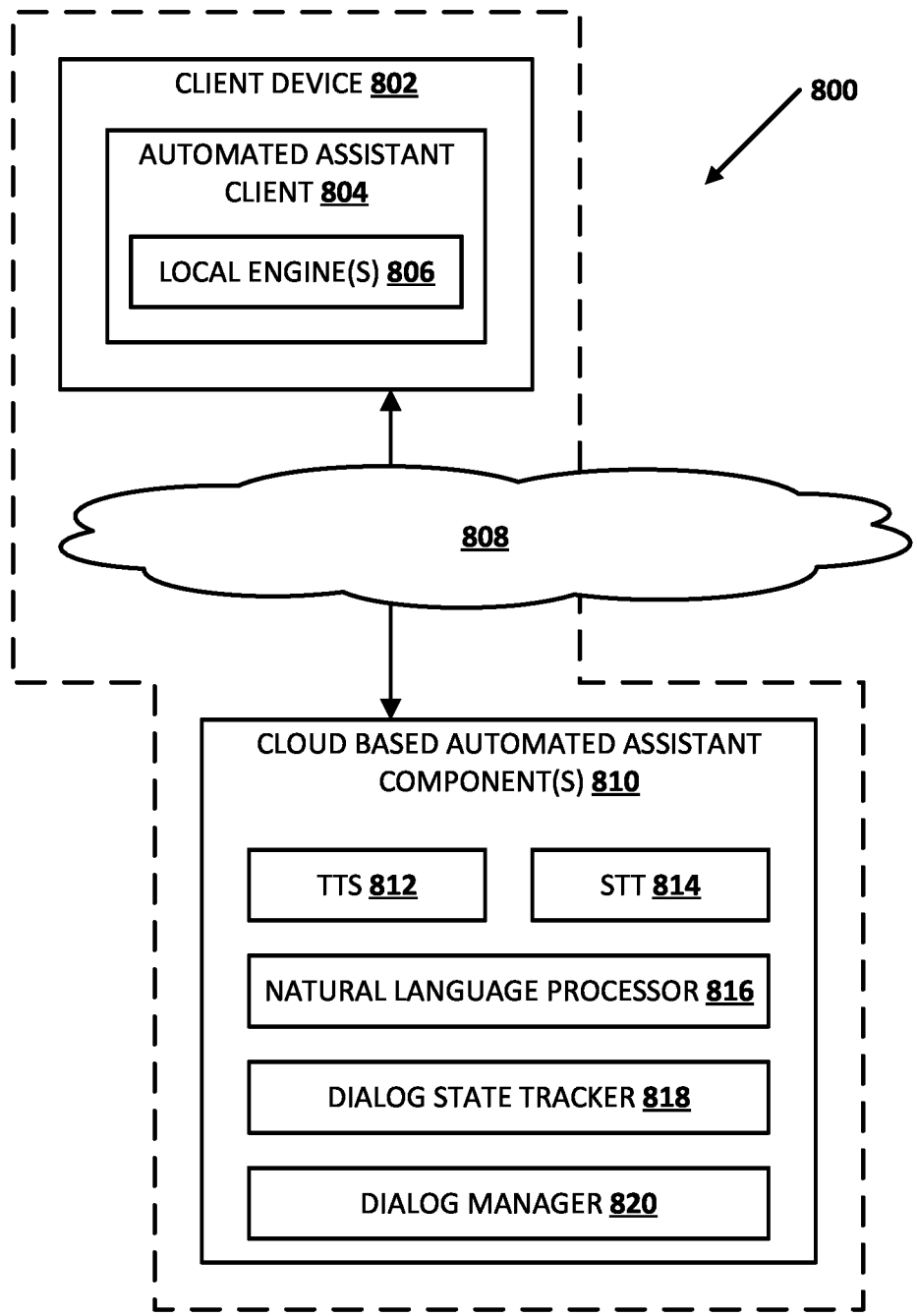
FIG. 8 illustrates another example environment in which various implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring).

The one or more local engine(s) 806 of automated assistant 800 are optional, and can include, for example, the personalized endpointing engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

In some implementations, dialog state tracker 818 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 820 may be configured to map a current dialog state, e.g., provided by dialog state tracker 818, to one or more "responsive actions" of a plurality of candidate responsive actions that are then performed by automated assistant 800. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 800 outputting additional natural language dialog. This responsive dialog may include, for instance, requests that the user provide parameters for some action (i.e., fill slots) that dialog state tracker 818 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 9:
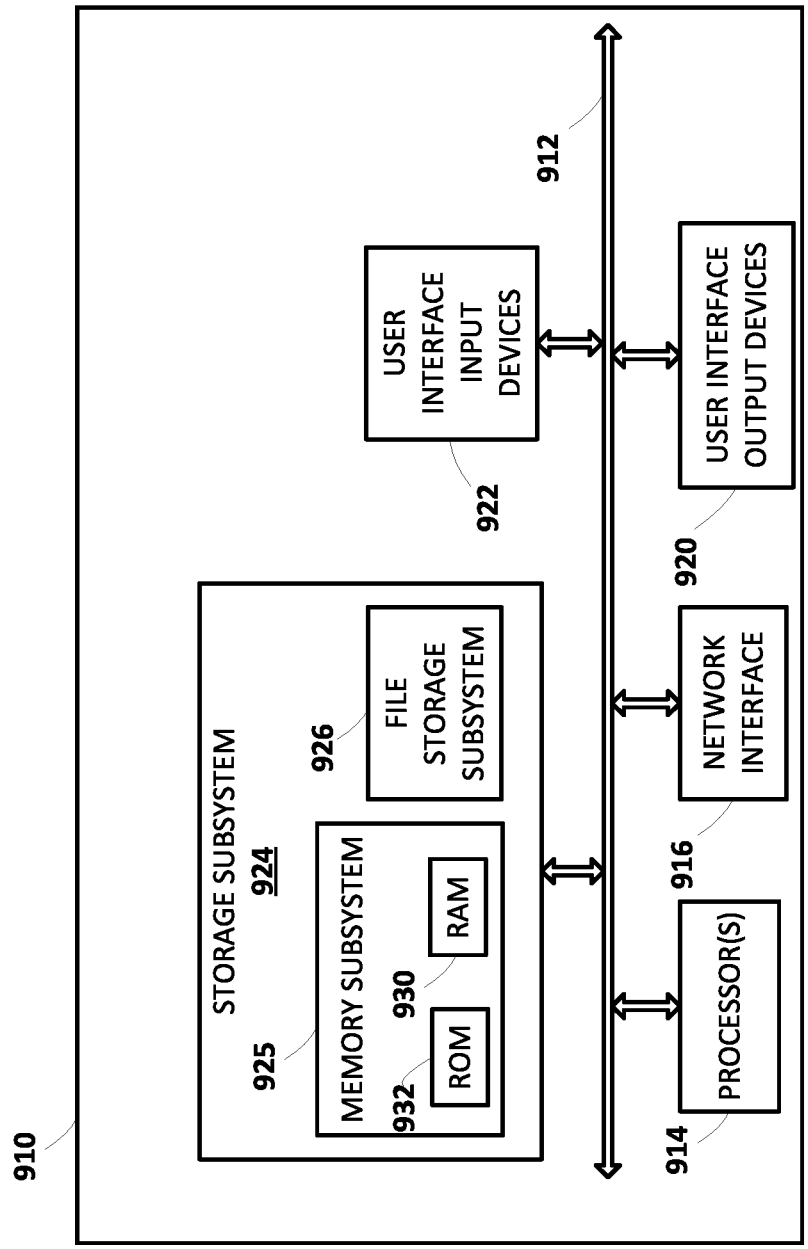
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 4, FIG. 5, FIG. 6, and/or FIG. 7, as well as to implement various components depicted in FIG. 3 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes processing an audio data stream capturing a spoken utterance of a user where the audio data stream is captured via one or more microphones of a client device. In some implementations, the method further includes detecting a candidate endpoint in the audio data stream. In some implementations, the method further includes determining whether the candidate endpoint is an actual endpoint based on: a text representation of a portion of the spoken utterance immediately preceding the candidate endpoint, and a user-specific measure that is based on the text representation and one or more historical interactions with the user, where the historical interactions are specific to the text representation and the user, and where the historical interactions each indicate whether a previous instance of the text representation was a previous endpoint for the user.

These and other implementations of the technology can include one or more of the following features.

In some implementations, the portion of the spoken utterance, that immediately precedes the candidate endpoint, excludes an additional portion of the spoken utterance, and the additional portion further precedes the portion of the spoken utterance. In some versions of those implementations, the method further includes determining, based on processing the additional portion of the spoken utterance, content that is responsive to the additional portion. In some versions of those implementations, in response to determining the candidate endpoint is the actual endpoint, the method further includes causing the client device to render output based on the content.

In some implementations, detecting the candidate endpoint in the audio data stream includes processing the audio data stream using an endpointing model to detect the candidate endpoint.

In some implementations, detecting the candidate endpoint in the audio data stream includes processing the audio data stream using an automatic speech recognition (ASR) model to generate the candidate endpoint along with the text representation of the spoken utterance.

In some implementations, the text representation of the portion of the spoken utterance is generated by processing the audio data stream using an automatic speech recognition (ASR) model.

In some implementations, the method further includes processing a further audio data stream capturing a further spoken utterance of the user, where the further audio data stream is captured via the one or more microphones of the client device. In some implementations, the method further includes detecting a further candidate endpoint in the further audio data stream. In some implementations, the method further includes determining whether the further candidate endpoint is a further actual endpoint based on: a further text representation of a portion of the further spoken utterance immediately preceding the further candidate endpoint, where the further text representation corresponds to the text representation of the portion of the spoken utterance, and a further user-specific measure that is based on the further text representation and the one or more historical interactions with the user, where the historical interactions are specific to the further text representation and the text representation, where the historical interactions include the spoken utterance and whether the candidate endpoint was the true endpoint for the user.

In some implementations, the user-specific measure that is based on the text representation and the one or more historical interactions that are specific to the text representation and the user is generated by processing the text representation of the portion of the spoken utterance immediately preceding the candidate endpoint and/or the audio data capturing the spoken utterance using a personalized endpointing model. In some versions of those implementations, the personalized endpointing model was previously trained using the one or more historical interactions.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
processing an audio data stream capturing a spoken utterance of a user where the audio data stream is captured via one or more microphones of a client device;
detecting a candidate endpoint in the audio data stream; and
determining whether the candidate endpoint is an actual endpoint based on:
a text representation of a portion of the spoken utterance immediately preceding the candidate endpoint, and
a user-specific measure that is based on the text representation and one or more historical interactions with the user, where each of the one or more historical interactions is based on processing a previous audio data stream capturing the user speaking a previous instance of the spoken utterance, where the previous instance of the user speaking the spoken utterance captured in the previous audio data stream is the same spoken utterance spoken by the user captured in the audio data stream, where the historical interactions are specific to the text representation and the user, and where the historical interactions each indicate whether a previous instance of the text representation was a previous endpoint for the user.

2. The method of claim 1, wherein the portion of the spoken utterance, that immediately precedes the candidate endpoint, excludes an additional portion of the spoken utterance, and
wherein the additional portion further precedes the portion of the spoken utterance.

3. The method of claim 2, further comprising:
determining, based on processing the additional portion of the spoken utterance, content that is responsive to the additional portion; and
in response to determining the candidate endpoint is the actual endpoint, causing the client device to render output based on the content.

4. The method of claim 1, wherein the user-specific measure that is based on the text representation and the one or more historical interactions that are specific to the text representation and the user is generated by processing the text representation of the portion of the spoken utterance immediately preceding the candidate endpoint and/or the audio data capturing the spoken utterance using a personalized endpointing model.

5. The method of claim 4, wherein the personalized endpointing model was previously trained using the one or more historical interactions.

6. The method of claim 1, wherein detecting the candidate endpoint in the audio data stream comprises:
processing the audio data stream using an endpointing model to detect the candidate endpoint.

7. The method of claim 1, wherein detecting the candidate endpoint in the audio data stream comprises:
processing the audio data stream using an automatic speech recognition (ASR) model to generate the candidate endpoint along with the text representation of the spoken utterance.

8. The method of claim 1, wherein the text representation of the portion of the spoken utterance is generated by processing the audio data stream using an automatic speech recognition (ASR) model.

9. The method of claim 1, further comprising:
processing a further audio data stream capturing a further spoken utterance of the user, where the further audio data stream is captured via the one or more microphones of the client device;
detecting a further candidate endpoint in the further audio data stream;
determining whether the further candidate endpoint is a further actual endpoint based on:
a further text representation of a portion of the further spoken utterance immediately preceding the further candidate endpoint, where the further text representation corresponds to the text representation of the portion of the spoken utterance, and
a further user-specific measure that is based on the further text representation and the one or more historical interactions with the user, where the historical interactions are specific to the further text representation and the text representation, where the historical interactions include the spoken utterance and whether the candidate endpoint was a true endpoint for the user.

10. A client device, comprising:
one or more processors, and
memory configured to store instructions that, when executed by the one or more processors, cause the one or more processors to perform a method that includes:
processing an audio data stream capturing a spoken utterance of a user where the audio data stream is captured via one or more microphones of a client device;
detecting a candidate endpoint in the audio data stream; and
determining whether the candidate endpoint is an actual endpoint based on:
a text representation of a portion of the spoken utterance immediately preceding the candidate endpoint, and
a user-specific measure that is based on the text representation and one or more historical interactions with the user, where each of the one or more historical interactions is based on processing a previous audio data stream capturing the user speaking a previous instance of the spoken utterance, where the previous instance of the user speaking the spoken utterance captured in the previous audio data stream is the same spoken utterance spoken by the user captured in the audio data stream, where historical interactions are specific to the text representation and the user, and where the historical interactions each indicate whether a previous instance of the text representation was a previous endpoint for the user.

11. The client device of claim 10, wherein the portion of the spoken utterance, that immediately precedes the candidate endpoint, excludes an additional portion of the spoken utterance, and
wherein the additional portion further precedes the portion of the spoken utterance.

12. The client device of claim 11, wherein the instructions further include:
   determining, based on processing the additional portion of the spoken utterance, content that is responsive to the additional portion; and
   in response to determining the candidate endpoint is the actual endpoint, causing the client device to render output based on the content.

13. The client device of claim 10, wherein the user-specific measure that is based on the text representation and the one or more historical interactions that are specific to the text representation and the user is generated by processing the text representation of the portion of the spoken utterance immediately preceding the candidate endpoint and/or the audio data capturing the spoken utterance using a personalized endpointing model.

14. The client device of claim 13, wherein the personalized endpointing model was previously trained using the one or more historical interactions.

15. The client device of claim 10, wherein detecting the candidate endpoint in the audio data stream comprises:
   processing the audio data stream using an endpointing model to detect the candidate endpoint.

16. The client device of claim 10, wherein detecting the candidate endpoint in the audio data stream comprises:
   processing the audio data stream using an automatic speech recognition (ASR) model to generate the candidate endpoint along with the text representation of the spoken utterance.

17. The client device of claim 10, wherein the text representation of the portion of the spoken utterance is generated by processing the audio data stream using an automatic speech recognition (ASR) model.

18. The client device of claim 10, wherein the instructions further include:
   processing a further audio data stream capturing a further spoken utterance of the user, where the further audio data stream is captured via the one or more microphones of the client device;
   detecting a further candidate endpoint in the further audio data stream;
   determining whether the further candidate endpoint is a further actual endpoint based on:
      a further text representation of a portion of the further spoken utterance immediately preceding the further candidate endpoint, where the further text representation corresponds to the text representation of the portion of the spoken utterance, and
      a further user-specific measure that is based on the further text representation and the one or more historical interactions with the user, where the historical interactions are specific to the further text representation and the text representation, where the historical interactions include the spoken utterance and whether the candidate endpoint was a true endpoint for the user.

* * * * *